(12) United States Patent
Vaman et al.

(10) Patent No.: US 9,553,741 B2
(45) Date of Patent: Jan. 24, 2017

(54) ADAPTIVE DEMODULATION METHOD AND APPARATUS USING AN ARTIFICIAL NEURAL NETWORK TO IMPROVE DATA RECOVERY IN HIGH SPEED CHANNELS

(71) Applicants: Dhadesugoor Vaman, Spring, TX (US); Oluwatobi Olabiyi, Herndon, VA (US)

(72) Inventors: Dhadesugoor Vaman, Spring, TX (US); Oluwatobi Olabiyi, Herndon, VA (US)

(73) Assignee: Kelquan Holdings Ltd. (MT)

(*) Notice: Subject to any disclaimer, the term of this patent is extended or adjusted under 35 U.S.C. 154(b) by 0 days.

(21) Appl. No.: 15/143,756

(22) Filed: May 2, 2016

(65) Prior Publication Data

US 2016/0248610 A1  Aug. 25, 2016

Related U.S. Application Data

(63) Continuation of application No. 14/714,536, filed on May 18, 2015, now abandoned, which is a continuation-in-part of application No. 14/312,072, filed on Jun. 23, 2014, now Pat. No. 9,036,745.

(60) Provisional application No. 61/837,742, filed on Jun. 21, 2013.

(51) Int. Cl.
*H04L 25/03* (2006.01)

(52) U.S. Cl.
CPC ... *H04L 25/03165* (2013.01); *H04L 25/03006* (2013.01); *H04L 25/03019* (2013.01); *H04L 25/03159* (2013.01); *H04L 25/03821* (2013.01); *H04L 2025/03636* (2013.01)

(58) Field of Classification Search
CPC ............. H04L 25/03821; H04L 25/03165; H04L 25/03019; H04L 25/03006; H04L 25/03159
See application file for complete search history.

(56) References Cited

U.S. PATENT DOCUMENTS

| | | | |
|---|---|---|---|
| 4,885,757 A | 12/1989 | Provence | |
| 5,434,883 A | 7/1995 | Kimoto et al. | |
| 5,548,684 A * | 8/1996 | Wang | H03M 13/41 704/242 |
| 5,956,372 A | 9/1999 | Vaman | |
| 7,352,832 B1 * | 4/2008 | Lewis | H04L 25/06 375/345 |
| 7,769,118 B2 | 8/2010 | Haghighat | |
| 7,903,772 B2 | 3/2011 | Jensen | |
| 8,233,564 B2 | 7/2012 | Gruenberg et al. | |
| 2009/0168913 A1 | 7/2009 | Nakagiri | |
| 2014/0376669 A1 | 12/2014 | Vaman et al. | |
| 2015/0214987 A1 * | 7/2015 | Yu | H04B 1/0475 375/297 |

* cited by examiner

*Primary Examiner* — Leon Flores
(74) *Attorney, Agent, or Firm* — Keith D. Nowak; Carter Ledyard & Milburn LLP

(57) ABSTRACT

A neural network demodulator is used within a receiver to provide Inter Symbol Interference (ISI) channel equalization and to correct for I/Q/phase imbalance. The neural network is trained with a single integrated training step to simultaneously handle the channel impairments of ISI equalization and I/Q phase imbalance as opposed to prior art methods of separately addressing each channel impairment in sequence.

11 Claims, 3 Drawing Sheets

US 9,553,741 B2

ADAPTIVE DEMODULATION METHOD AND APPARATUS USING AN ARTIFICIAL NEURAL NETWORK TO IMPROVE DATA RECOVERY IN HIGH SPEED CHANNELS

RELATED APPLICATIONS

This application is a continuation of U.S. patent application Ser. No. 14/714,536, filed May 18, 2015, which is a continuation-in-part of U.S. patent application Ser. No. 14/312,072, filed Jun. 23, 2014 (issued as U.S. 9,036,745), and U.S. Provisional Patent Application No. 61/837,742, filed Jun. 21, 2013, all of which are hereby incorporated by reference in their entirety.

FIELD OF THE INVENTION

The present invention relates to a neural network based integrated demodulator that mitigates channel impairments, ISI and I/Q channel leakages, and minimizes the impact on the overall performance of the system. In this process, the inventive demodulator improves the performance for data recovery when operating at high data rates over the transmission channel.

BACKGROUND OF THE INVENTION

High-Speed communications systems typically use a wide band channel where the transmission is achieved using Radio Frequency (RF) carriers. RF transmission as it exists today either uses closely spaced narrow band multiple carriers or a small number of carriers containing baseband modulated signals.

An example of a closely spaced narrow band multiple carrier system is the Orthogonal Frequency Division Multiplexing (OFDM) system, which uses a large number of RF carriers with each carrier carrying two base band modulation signals (I/Q). Since OFDM uses orthogonal carriers, the transmission does not suffer any Inter-Frequency-Interference (IFI). Also, the data processing at the receiver uses a simple Fast Fourier Transform (FFT) technique. Due to the orthogonality of the RF carriers, an OFDM transmission system is more robust to Inter-Symbol-Interference (ISI). However, when ISI exists, the system requires the use of a Cyclic Prefix as an overhead and a channel equalizer to handle ISI.

An example of a small number of carriers containing baseband modulated signals is the "Kelquan" system based on the teachings presented in U.S. Pat. Nos. 5,956,372 and 8,233,564 where closely spaced non-orthogonal frequencies are used to create baseband modulated signals which are carried in a small number of RF carriers as I/Q channels over a wideband bandwidth. In this system, the data is recovered optimally after the IFI suppression using a Neural Network Matched Filter. This system requires no overhead, but needs a robust equalizer to handle ISI.

In both of the above scenarios, the performance of high-speed digital transmission suffers high degradation due to the effects of channel impairments. Specifically, the channel impairments, which include Inter-Symbol-Interference and the leakage of I/Q modulated signals, which are sent over each of the RF carriers, significantly degrades the Bit Error Rate (BER) performance. The ISI is caused by the change of bandwidth of the frequencies of specific symbols, spilling over to the next set of symbols, or to the previous set of symbols. The leakage of I/Q signals on each other is caused by the imperfect phase alignment between the transmit and receiver carrier phases. In OFDM systems, the leakage of I/Q signals can be more predominant in wireless channels as opposed to wireline channels. In a small number of carrier based systems, both wireline and wireless channels experience leakage of I/Q due to imperfect phase imbalance. As the transmit systems carry large data rates, the sensitivity to these channel impairments become significant.

In accordance with the invention described herein, an Artificial Neural Network (ANN) based demodulator is shown that handles the ISI and I/Q leakage due to phase imbalance as a single apparatus. The novel design of this demodulator simplifies the adaptive demodulator complexity and improves the data recovery process significantly in terms of Bit Error Rates (BER).

While the invention is applicable to broader transmission channels, the preferred embodiment is a system that has a small number of RF carriers for transmission over a wideband channel.

Traditional systems use two different systems to handle these two channel impairments, where each system requires separate training time during initialization. When both impairments are handled separately with each requiring its own training time, the computation time to optimize the design with appropriate correction coefficients increases. Also, there could be bottlenecks in the design process to achieve optimal system performance, when these two impairments are handled sequentially, one after another. The teaching of this invention is directed to an integrated demodulator that avoids this pitfall by simultaneously handling both I/Q imbalance and ISI with a single training sequence. This process develops the necessary coefficients for an ANN demodulator to achieve optimum performance.

In summary, this invention teaches the design of an Artificial Neural Network based Demodulator that achieves the following functions at the receiver:
1. Compensates for the I/Q imbalance due to carrier phase miss-alignment between the transmitter and receiver
2. Equalizes the ISI introduced by the channel
3. Equalizes the ISI introduced by the channel filter
4. Recovers the original data which was used for modulation at the sending side.

The proposed invention achieves significant advantages over traditional methods of handling transmission impairments, for example,
   It reduces the computational complexity of the demodulation process using single operation as opposed to multiple operations.
   It leads to more accurate and robust handling of channel impairments at the receiver due to integrated operation instead of sequential operations.
   It increases the battery life of mobile apparatus (particularly useful to handheld devices) by extending the mean time before failure.

Equalization techniques broadly support handling transmission impairments over different channels: wireline communications or wireless communications or highly dispersive channels. The transmission impairments can be different in different channels.

In wireline channels, the channel equalization is designed to handle ISI and reflections. The concept of equalization relates to the loss compensation for the equalizer as a figure of merit, which is used to derive the performance of the data recovery at the receiver. Since the distance between the sending side and the receiving side is fixed, the channel characteristics are known 'a priori' and it is possible to a use a Minimum Mean Squared Error (MMSE) equalizer to minimize the effect of ISI. When the channel transfer function is unknown, it is imperative to use an adaptive MMSE equalizer.

There are implementations of equalizers used to handle ISI based on Least Mean Squared Error (LMSE). This equalizer performs well in minimizing the effect of ISI as long as the phase variation on the channel is low. Although a LMSE equalizer works well in a minimum phase channel, its performance is very limited in a channel with spectral nulls. In such cases, the convergence of an LMS equalizer is not guaranteed and ISI effects cannot be minimized.

Another alternative to handle the ISI problem is the use of a Decision Feedback Equalizer (DFE). While the DFE outperforms the LMS, it is more complex than the LMS equalizer. Furthermore the DFE suffers from an error propagation problem and therefore is only used at very high SNR scenario. The MMSE, LMSE and DFE equalizers can only minimize the effect of ISI on the performance, but cannot handle the I/Q phase alignment problem. The present invention of an integrated demodulator which both equalizes ISI and compensates I/Q/imbalance outperforms a LMSE equalizer even for non-minimum phase variation in the channel.

In wireless channels, the channel equalization is more complex when handling ISI due to rapid changes in channel behavior because of mobility and channel fading. The channel can be modeled as a highly dispersive channel and will require a more complex operation to reduce or eliminate the ISI effects. These channels tend to be more time invariant, but are adaptive and therefore, the channel equalizers tend to be adaptive to compensate and adjust for the slow variations of the channel.

Some of the equalization methods used to handle wireless channels include:

a. The method to nullify or mitigate the effect of channel response by employing a training period to initialize the channel equalizer that has a simple adaptive system. Some techniques in this category include also a blind equalization technique without a training period by employing different and possible-to-estimate channel characteristics.

b. For OFDM channels, which use a narrow frequency band, the channel equalization reduces the problem to handle flat fading or a frequency non-selective system.

c. For handling channel fading, techniques such as multiple transmission of the same information over independent channels and waiting for the fading to recede before sending have been exploited. The ultimate measure is the improvement of probability of error in fading channels.

In summary, there are many teachings to design channel equalizers based on neural networks to handle one selective parameter at a time. As such, designing the equalizer to handle multiple effects on the channel is more optimum and robust than handling parameters one at a time which can cause delay in processing to achieve optimization.

The proposed teaching in this invention is to demonstrate designing the inventive demodulator to handle the effects of more than one parameter simultaneously with a single training sequence while achieving optimum performance for data recovery at the receiver.

SUMMARY OF THE INVENTION

The invention described herein is directed to a neural network based demodulator for use in a communication system, wherein information sent over the communication channel can be impaired by I/Q/imbalance and Inter Symbol Interference. The neural network based demodulator functions to simultaneously compensate for the I/Q imbalance and to equalize the Inter Symbol Interference after a single integrated training step.

DETAILED DESCRIPTION

The objective of the present invention is to provide a design for an Artificial Neural Network (ANN) based Demodulator that consists of the following elements which operate as an integrated process for ISI handling and I/Q channel phase imbalance:

Sending side:
  TXSRF (Pulse Shaper)
Receiving side:
  I/Q Demodulator
  RXSRF (Pulse Matching)
  ANN Demodulator with I/Q Balancer
  ANN Equalizer The preferred embodiment for the present invention is an ANN Demodulator for use in a system such as described in U.S. Pat. Nos. 5,956,372 and 8,233,564, although the use of the present invention is not limited to this preferred embodiment.

Figure 1:
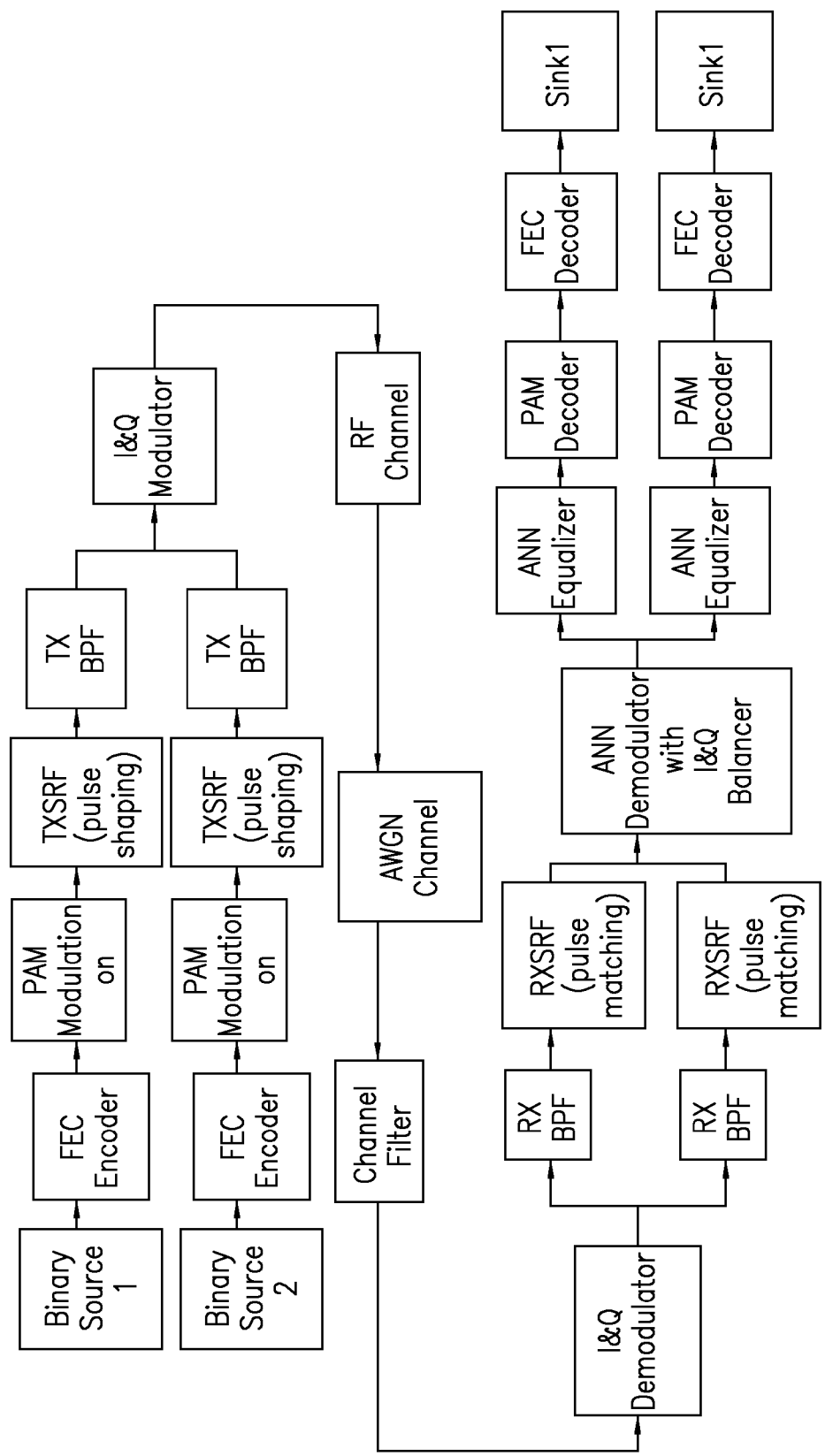
FIG. 1 is a block schematic diagram of a high-speed data transmission system.

FIG. 1 shows the overall block schematic of the system for high-speed data transmission that includes the components of the ANN based Demodulator.

(1) TXSRF as a Pulse Shaper

Figure 2:
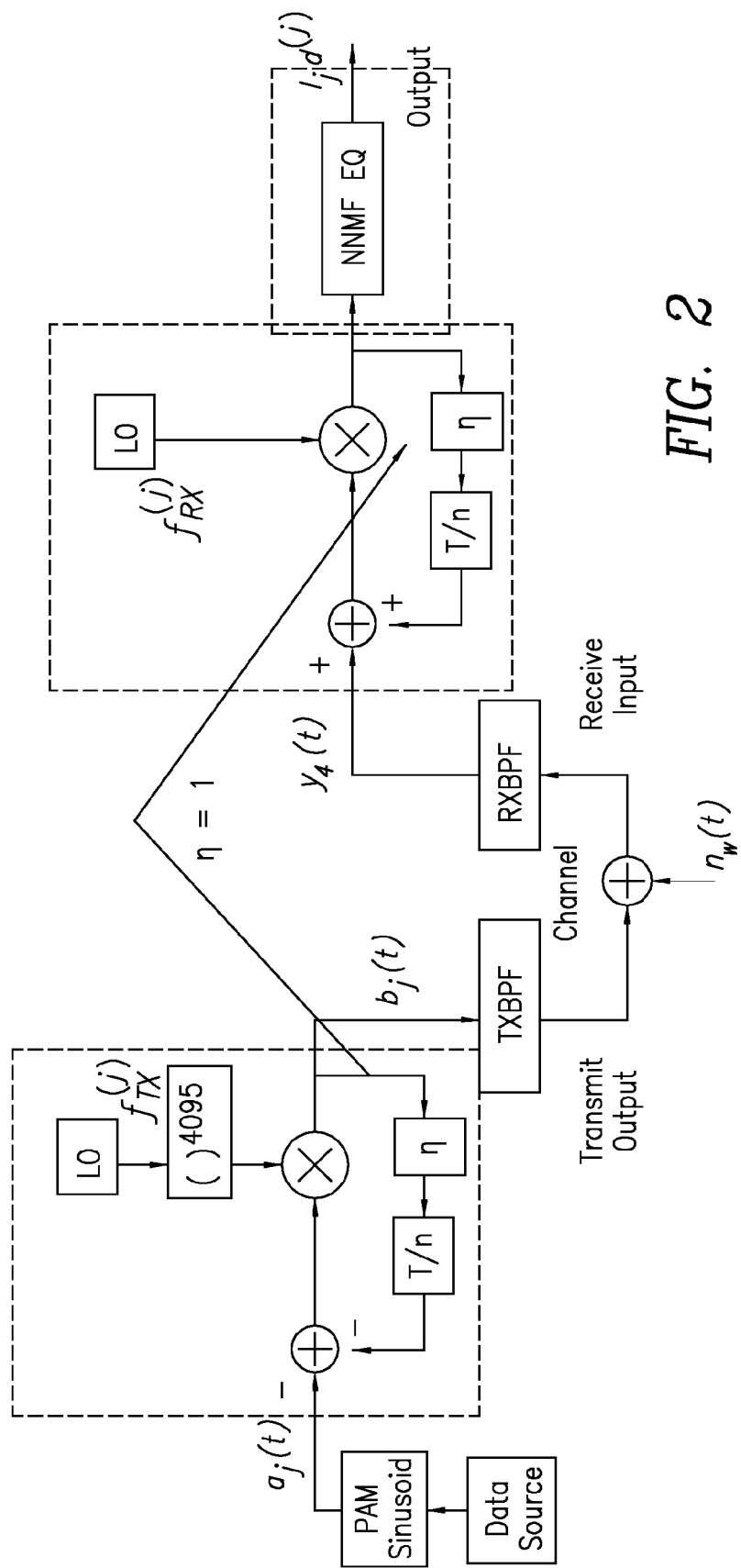
FIG. 2 is an illustration of TXSRF using LO exponent of 4096 and RXSRF with LO exponent of 1.

The TXSRF which is part of the earlier patents (U.S. Pat. Nos. 5,956,372 and 8,233,564) as well as this application's parent, takes the Pulse Amplitude Modulated sinusoids and creates spike voltages. In the referenced patents and patent application, the spike voltages are created by having very high re-circulation for each symbol in the order of a million samples per second. From a practical implementation, the re-circulation rate is kept at 64 mega samples per second while the Local Oscillator has an exponent of 4096. The TXSRF which creates the spikes is referred to as a "Pulse Shaper" (see FIG. 1). FIG. 2 illustrates the modified TXSRF with LO exponent of 4096. Exponent implies that the LO output is raised to the power of 4096. Since the implementation of TXSRF can be done using a look up table with all possible inputs and all possible outputs, an LO exponent of this magnitude can be implemented more realistically.

The output of TXSRF goes through a Transmit Band Pass Filter (TXBPF) as shown in FIGS. 1 and 2.

(2) I/Q Demodulator

Each RF carrier has two independent baseband data channels which are orthogonal to each other (I and Q). They can be separated and the demodulator extracts the baseband signals before being processed by an individual RXSRF. The I and Q demodulated signals are passed through RXBPF before processing by RXSRF.

(3) RXSRF (Pulse Matching)

The RXSRF is already shown in earlier U.S. Pat. Nos. 5,956,372 and 8,233,564, as well as this application's parent. It is critical that the LO exponent is not increased in the RXSRF. The input to the RXSRF is a combination of multiple signals from different TXSRFs with added channel noise and when the exponent of LO is raised, even though the signals spike, the channel noise can exacerbate and cause degradation in the BER while recovering the data. Therefore, the LO exponent of RXSRF is kept at 1 as shown in FIG. 2.

(4) ANN Demodulator with I/Q Balancer

The performance of traditional digital modulation schemes operating at high data rates suffers significant degradation due to the effects of channel impairment. The important channel effects include Inter Symbol Interference (ISI), and I/Q channel leakage which is due to imperfect phase alignment between transmit and receive carriers.

In the prior art, these two channel impairments are handled separately, each requiring its own training time and computation time to come up with appropriate correction coefficients.

For high data rate operation, this can create a bottleneck resulting in poorer performance when each an impairment is handled before the other. For example, when I/Q phase balancing is achieved before handling ISI by using an equalizer, the equalizer may not operate optimally with respect to performance errors. On the other hand, if the equalizer is designed optimally, I/Q balancing may fail resulting in higher performance errors.

The present invention teaches simultaneous handling of both the impairments as part of the inventive ANN demodulator to achieve optimal BER performance. The ANN demodulator handles the following operations at the receiver:

1. Compensates for the I/Q imbalance due to carrier phase miss-alignment between the transmitter and receiver
2. Equalizes the ISI introduced by the channel
3. Equalizes the ISI introduced by the channel filter
4. Recovers the original modulated symbols for recovering the data.

The proposed invention uses the same training sequence for handling the impairments simultaneously.

This invention simultaneously handles both I&Q balancing and ISI with the same training sequence. The teachings of the design of the neural network and the training algorithm for matched filter application is presented in patent application U.S. Ser. No. 14/312,072, which is the parent of this application. The proposed invention extends the teachings of U.S. Ser. No. 14/312,072 on the ANN match filter described therein to a combined matched filtering, equalization and I/Q balancing algorithm.

This invention reduces the training time required for the digital signal processing of the algorithms for match filtering, equalization and I/Q balancing. The training time taken for the integrated process is significantly lower compared to processing each of these algorithms independently. In addition, the computational complexity of the demodulation process which is a combination of multiple processes reduces to a single operation. This reduction in complexity will increase the battery life of a hand held device and extend the mean time before failure of the device. In more general terms, this invention will increase the versatility and agility of a digital communication receiver. Also it leads to a more robust handling of channel impairments by the receivers.

(5) ANN Demodulator

The demodulator is a combined I/Q balancer and equalizer i.e. it has the capability of handling both interference and ISI cancellation.

Assuming that a complex modulated data stream at the transmitter is given by $$x^t = x_I^t + j x_Q^t \quad (1)$$

After passing through a complex channel with channel matrix given by $$H = H_I + j H_Q \quad (2)$$

The channel output Y is given as the product of X and H yielding $$y = Hx^t + n = y_I + j y_Q + n = H_I x_I^t + j H_Q x_Q^t + n \quad (3)$$

Where n is the noise vector.

When the orthogonality of I and Q is lost due to imperfect phase synchronization, the new received signal becomes a linear combination of the I/Q components, i.e.

$$y' = y'_I + j y'_Q + n \quad (4)$$

Where $$y'_I = a y_I - b y_Q \quad (5)$$

$$y'_Q = b y_I + a y_Q$$

With the parameters $a = \cos\theta$ and $b = \sin\theta$, and $\theta$ is the phase angle difference between transmit carrier and the reference LO carrier.

In traditional systems, the I/Q imbalance is first taken care of before the channel equalization. This could be achieved in two ways:

1. Using carrier training: During the training period, an unmodulated carrier is sent from the transmitter to the receiver. Based on the received signal at the output of the matched filters, $\theta$ could be determined using equation (5) and the receiver LO phase can be adjusted accordingly to make sure that $\theta$ becomes zero thereby isolating I from Q channels. This method is used when the channel is (quasi) stationary.
2. Using real time phase recovery: Alternatively, when the channel varies more frequently, $y_1$ and $y_Q$ can be extracted from $y'_I$ and $y'_Q$ without explicitly obtaining the phase difference $\theta$. This method comes with an additional computational complexity during the data recovery stage.

After the I/Q channels are balanced, each of the recovered I and Q data ($y_I$ and $y_Q$) are then equalized independently to recover the originally transmitted baseband modulated symbols $x_I^t$ and $x_Q^t$. Since H is not known a priori, there's another training sequence required in order to estimate the channel impulse response and then determine the equalizer coefficient. The computed equalizer coefficients can then be used to recover $x_I^t$ and $x_Q^t$.

The overall computational complexity by the above method introduces more real estate in the hardware as well as adds more computational time.

Figure 3:
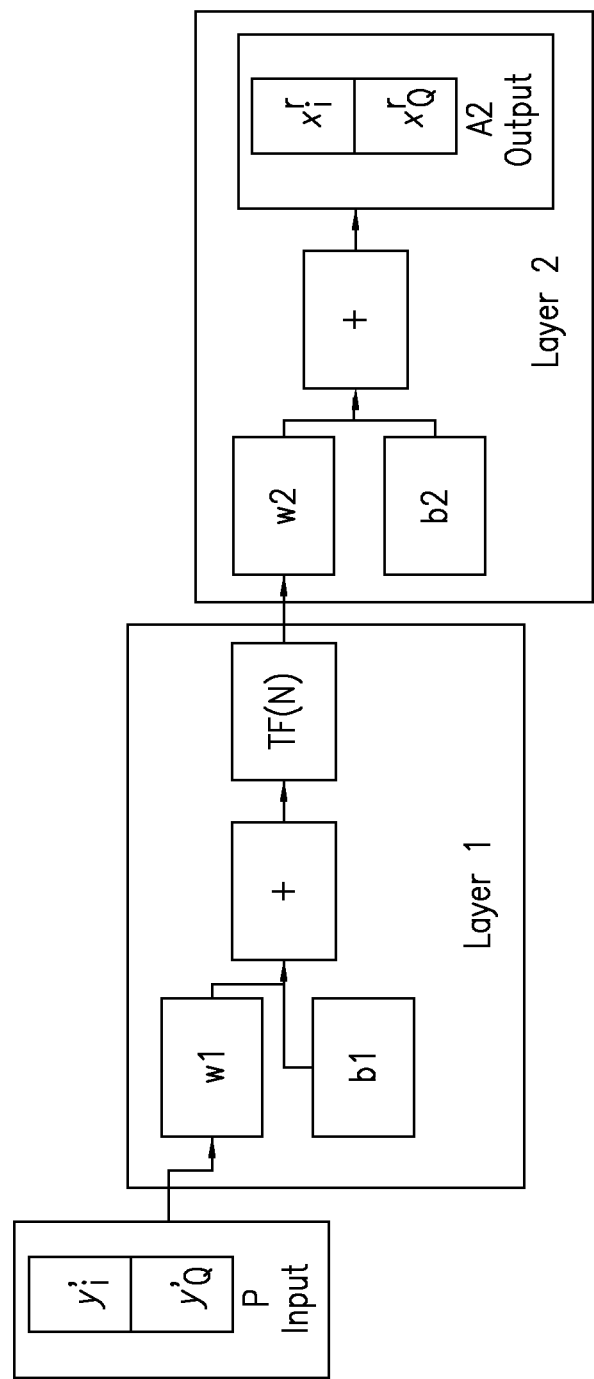
FIG. 3 is a schematic of a neural network performing I/Q balancing and equalization simultaneously.

In contrast, in the proposed teaching, the inventive demodulator described herein uses only a single training period, where the equalizer function iteratively computes efficient coefficients that can be used to balance I/Q channels and perform equalization at the same time. During the training stage, both I/Q data are fed into the neural network as inputs (shown in FIG. 3). The neural network shown in FIG. 3 is the same two layer configuration shown in FIG. 5 of parent application Ser. No. 14/312,072. The neural network will then determine the coefficients to create an appropriate model that performs I/Q balancing and equalization at the same time. Since the computational complexity of training a single neural network is similar to that of training a traditional equalizer, the second stage training process has now been reduced into a single one. Also, only one neural network equalizer is required for both I/Q channels.

As set forth in parent application Ser. No. 14/312,072, the neural network training process determines the coefficients w1, b1, w2, b2 such that the mean squared error between the transmitted symbols $x^t$ and the equalized symbols $x^r$ (where $x^r = x_I^r + j x_Q^r$ is the output of the neural network demodulator is minimized. That is, the optimization problem can be defined as:

$$\underset{w1, b1, w2, b2}{\operatorname{argmin}} E[\|(x^r - x^t)\|^2] \quad (5)$$

The neural network output is calculated from the following mathematical steps:
The neural network input is the vector concatenation of the received I & Q data, i.e.

$$P = [y'_I; y'_Q] \quad (6)$$

$$N = w1 \times P + b1 \quad (7)$$

$$A1 = TF(N) = \max(-1, \min(1, N)) \quad (8)$$

$$A2 = w2 \times A1 + b2 \quad (9)$$

$$x^r = A2[x_I^r] + jA2[x_Q^r] \quad (10)$$

Where A2[z] is the subset of A2 that correspond to the z.

It is worth mentioning that the neural network input signal could be sampled at the symbol rate and therefore the neural network equalizer will function similar to a symbol-by-symbol equalizer or the input could be oversampled giving rise to a fractionally spaced equalizer. In the case where input sampling rate is the same as the sampling rate at the receiver input, the neural network demodulator can flexibly add matched filtering to its functions. In fact it is the ability of the neural network to combine matched filtering, I/Q balancing and equalization that lead to the name "neural network demodulator".

The following section compares the neural network equalizer function to the traditional transversal (LSM/RLS) equalizer:

The neural network equalizer can be seen as a two stage transversal equalizer. Therefore the residual ISI from the first layer is canceled in the second layer which makes it more superior to traditional transversal equalizers.

The neural network equalizer can be trained with varying length of input vector to speed up its convergence depending on how fast the channel is varying whereas as traditional transversal equalizer can only train one input sample at a time. In fact, due to the stochastic nature of the input vector, traditional transversal equalizers may never converge or be able to capture the underlying ISI signature of the channel.

Also, the neural network equalizer contains a transfer function TF(N) between the two layers to ensure that the training converges and does not diverge or get stuck in a sub-optimal local minimal The proposed invention uniquely exploits the flexibility that the neural network offers to handle multiple tasks faster which has never been exploited in traditional equalizers as designed for use in digital communication systems.

Although the present invention has been described in conjunction with specific embodiments, those skilled in the art of the present invention will appreciate that modifications and variations can be made without departing from the scope and the spirit of this invention. Such modifications and variations are envisioned to be within the scope of the amended claims.

The invention claimed is:

1. A method for use in a communication system, the communication system including a transmitter and a receiver, to provide ISI channel equalization and to correct I/Q phase imbalance, comprising,
   providing a demodulator as part of the receiver, the demodulator including a trainable neural network, and
   training the neural network in a single integrated training step to simultaneously enable the demodulator to provide ISI channel equalization and to correct I/Q phase imbalance.

2. A method in accordance with claim 1 wherein the neural network includes two layers, the method further comprising the step of implementing a transfer function between the two layers of the neural network to ensure convergence of the neural network training step.

3. A method in accordance with claim 2 wherein transmitter data symbols and RF carrier signals are sent over the communication channel from the transmitter to the receiver with the I/Q imbalance resulting from carrier phase misalignment between the transmitter and receiver, said neural network training step utilizing information sent over the communication channel to determine coefficients needed by the neural network to correct said carrier phase misalignment.

4. A method in accordance with claim 3 wherein transmitter data symbols and RF carrier signals are sent over the communication channel from the transmitter to the receiver with ISI resulting by the change of bandwidth of the carrier signal frequency causing interference between adjacent transmitter data symbols, said neural network training step utilizing information sent over the communication channel to determine coefficients needed by the neural network to prevent the interference between transmitter data symbols.

5. A method in accordance with claim 4 wherein the neural network training process determines coefficients W1, b1 W2 and b2 such that the mean squared error between a transmitted symbol and a symbol received at the output of the demodulator is minimized.

6. A communications system, comprising,
   a transmitter for sending modulated data symbols and carrier signals over the communications channel,
   a receiver including a demodulator, and a trainable neural network included as part of the demodulator, which when trained in a single integrated training step allows the demodulator to simultaneously provide ISI channel equalization and correct I/Q phase imbalance.

7. A communications system in accordance with claim 6, wherein the neural network includes two layers, one hidden layer and one output layer, the hidden layer applying a first set coefficients to data symbols from the receiver to create a first set of fixed point words, and processing the first set of fixed point words with a transfer function.

8. A communications system in accordance with claim 7, wherein the first set of fixed point words are sent to the output layer after processing by the transfer function and applied to a second set of coefficients.

9. A communications system in accordance with claim 8, wherein the neural network is trained based on information sent over the communication channel to generate the first and second set of coefficients.

10. A communications system in accordance with claim 9, wherein the first and second set of coefficients ensure that the mean squared error between a transmitted data symbol and a symbol at the output of the demodulator is minimized.

11. A method as recited in accordance with claim 1, further comprising training the neural network with carrying length of input vector.

\* \* \* \* \*